United States Patent
Benedetti, Jr. et al.

[11] Patent Number: 5,524,794
[45] Date of Patent: Jun. 11, 1996

[54] METERING DEVICE FOR GRANULAR MATERIALS

[75] Inventors: Albert M. Benedetti, Jr.; Paul A. Nolte, both of Memphis, Tenn.

[73] Assignee: Ingersoll-Dresser Pump Company, Liberty Corner, N.J.

[21] Appl. No.: 247,721

[22] Filed: May 23, 1994

[51] Int. Cl.$^6$ ........................................ B67D 5/33
[52] U.S. Cl. ................ 222/153.14; 222/504; 222/517
[58] Field of Search ............................. 222/153, 504, 222/506, 517, 518, 546, 556, 153.14; 251/129.2; 137/383, 384; 215/332

[56] References Cited

U.S. PATENT DOCUMENTS

| | | | |
|---|---|---|---|
| 2,838,208 | 6/1958 | Levit | 222/504 |
| 3,207,373 | 9/1965 | Dannermann | 222/517 |
| 3,335,753 | 8/1967 | Kiser | 251/129.2 |
| 4,930,669 | 6/1990 | Dickas et al. | 222/518 |
| 5,156,372 | 10/1992 | Conrad | 251/65 |
| 5,301,848 | 4/1994 | Conrad et al. | 222/613 |

*Primary Examiner*—Andres Kashnikow
*Assistant Examiner*—Philippe Derakshani
*Attorney, Agent, or Firm*—Michael H. Minns; Robert F. Palermo

[57] ABSTRACT

A metering device for controlling the flow of granular material from a container. The metering device includes an electromechanical solenoid connected to a pivoting metering bar. When the solenoid is energized, the metering bar is pivoted away from an outlet aperture, permitting the flow of material from the container. When the solenoid is de-energized, a spring causes the metering bar to pivot into contact with the outlet aperture, closing the outlet aperture and stopping the flow of material from the container.

16 Claims, 5 Drawing Sheets

5,524,794

METERING DEVICE FOR GRANULAR MATERIALS

BACKGROUND OF THE INVENTION

This invention relates generally to metering devices and more particularly to electromechanical metering devices for granular or particulate pesticides.

In markets requiring the usage of chemicals, often hazardous substances, the Environmental Protection Agency and other regulatory bodies are imposing stricter regulations on the transportation, handling, dispersion, disposal, and reporting of actual usage of chemicals. These regulations, along with public health concerns, has generated a need for products that address these issues dealing with proper chemical handling.

To reduce the quantity of chemicals handled, the concentration of the chemical, as applied, has been increasing. This has raised the cost of chemicals per unit weight and has also required more accurate dispensing systems. For example, typical existing systems for agricultural pesticide dispensing use a mechanical chain driven dispenser. Normal wear and tear on these mechanical dispensers can alter the rate of pesticide applied by as much as 15%. For one typical chemical, Force®, a pyrethroid type insecticide by ICI, an over-application rate of 15% can increase the cost of the insecticide by $750 over 500 acres.

The foregoing illustrates limitations known to exist in present metering devices. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a metering device comprising: a container including a bottom wall having an outlet aperture, the container being disposed with a supply of fluent material; an electromechanical solenoid attached to the container, the solenoid being operable from a first position to a second position; and a pivoting metering bar operably attached to the container, the metering bar having a first end and a second end, the first end being linked to the solenoid, the second end pivoting to a closed position when the solenoid is in the first position, the second end pivoting to an open position when the solenoid is in the second position.

The foregoing and other aspects will become apparent from the following detailed description of the invention when considered in conjunction with the accompanying drawing figures.

BRIEF DESCRIPTION OF THE DRAWING FIGURES

FIG. 2 is a side view showing the details of the metering bar connection to the solenoid;

DETAILED DESCRIPTION

Figure 1:
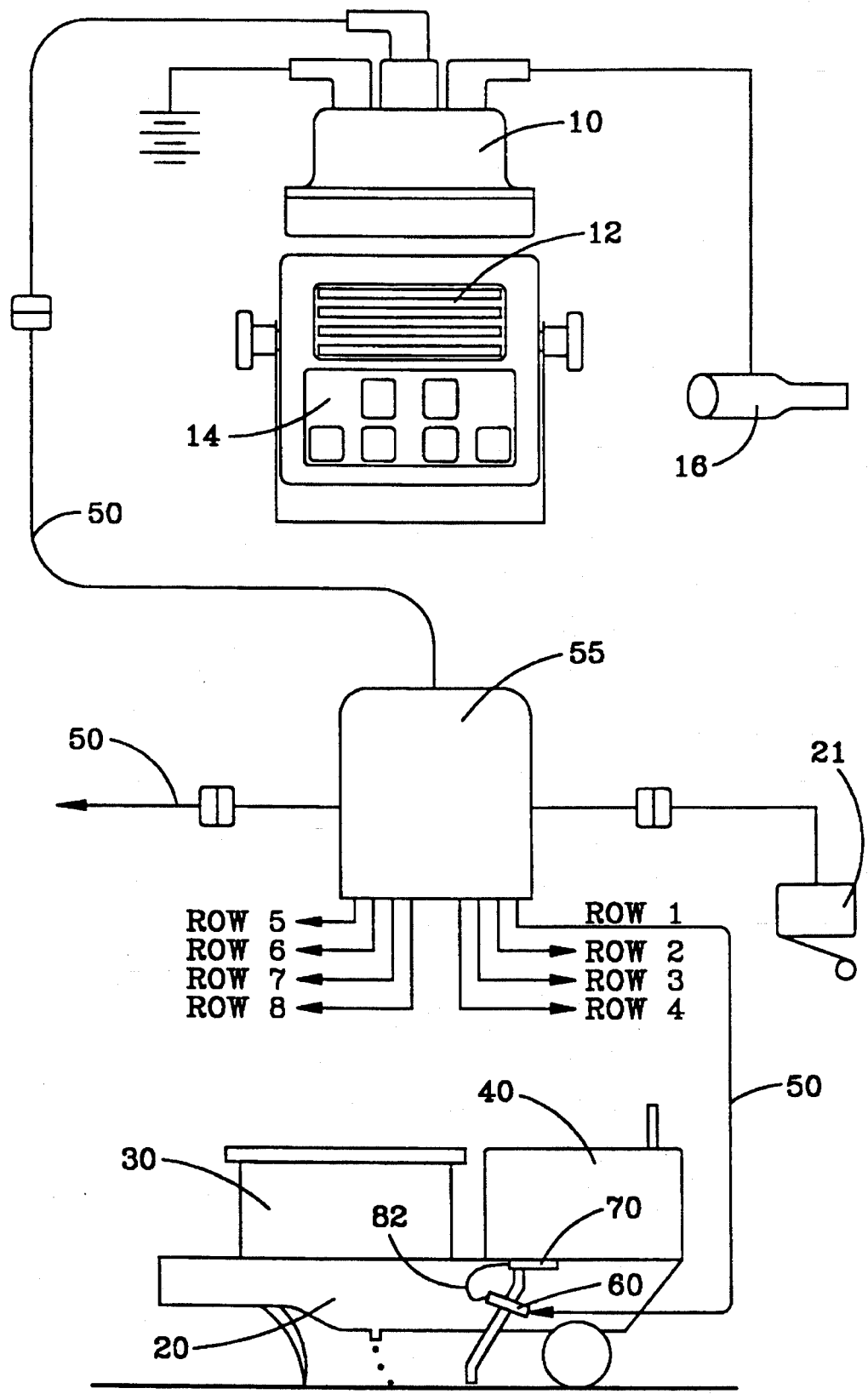
FIG. 1 is a simplified diagram showing a material dispensing system incorporating the present invention.

FIG. 1 shows a simplified diagram of a planter 20 incorporating a distributed control material dispensing system. The material dispensing system of the present invention may be used with other types of agricultural implements, but is primarily used with seed planting equipment. Although the FIGURES show a single row of planting equipment, typical planters include multiple rows, up to 24.

The distributed control system consists of a main microcontroller 10 which communicates to a plurality of sub-controllers 60. The sub-controllers 60 implement commands received from the main control unit 10 by applying electric power to an electromechanical metering device 72. The pesticide container 40 contains a memory device 80 for retaining information pertaining to the material in the container 40 and to the metering device 72. This information is used by the main control unit 10 and the sub-controllers 60 to properly dispense the pesticide.

The material dispensing system shown in the FIGURES is a distributed control system that employs a master microcontroller computer 10 located in the operator's cab. Typically, the material dispensing system is used in conjunction with a seed planter 20 which is attached to and pulled by a farmer's tractor (not shown). Each row of the seed planter 20 includes a seed hopper and seed planting mechanism 30 and a pesticide container and associated dispensing mechanism 40. Pesticides include, but are not limited to, insecticides, herbicides, fungicides, fertilizers and other agricultural chemicals. This master or main controller 10 distributes command and control information via a high speed serial communications link 50 to a plurality of individual meter systems 70. A typical agricultural planter may have up to 24 rows of seed hopper and seed planting mechanisms 30 and pesticide containers 40. Each row corresponds to one row in the field being planted. Each individual meter system 70 is controlled by its own slave or row controller 60. The meter system 70 consists of an electronic memory circuit 80 and an electromechanical metering or dispensing device 72. The meter system 70 is permanently attached to the pesticide container 40. Preferably, the meter system 70 is attached using a known tamper evident securing system. The row controller 60 includes a material flow sensor (not shown) which is integral with the row controller 60. The material flow sensor detects the presence or absence of flow from the pesticide container 40.

The distributed control material dispensing includes a main microcontroller unit 10 with a display 12 and keypad 14 for operator interface. A radar 16 is connected to the main control unit 10 to provide ground speed. Ground speed is used to modify the material dispensing rate to account for the planter's speed. The main control unit 10 is connected to a junction box 55 by a high speed serial communications link 50. The main controller 10 is in constant communication through the serial communications link 50 to the row control units 60 located on the planter.

The row control units 60 allow a method of multiplexing signals going to the main controller 10. A main benefit is that the main controller 10 can control a 24 row planter with only nine wires going to a junction box 55. One pair of wires is used for serial communications, three pairs of wires are provided for power to the row control units 60 and to the metering devices 72. One wire is provided for the lift switch 21. Three pairs of wires are used for power to more evenly distribute the current requirements.

The main controller 10 also contains a non-volatile memory unit, typically known as "flash" memory. Information pertaining to the usage and application of pesticides is stored in this nonvolatile memory unit. This information is used to prepare printed reports which meet EPA reporting requirements. Currently, farmers prepare these written reports manually.

The junction box 55 is connected by additional portions of the serial communications link 50 to a plurality of slave or subcontroller units 60. Each slave unit 60 is associated with one row of the planter 20, and is therefore referred to as a row control unit 60. The preferred junction box 55 can connect up to eight row control units 60 to the main control unit 10. If the planter 20 has more than eight rows, additional junction boxes 55 are connected in series to the first junction box 55. A lift switch 21 is connected to the first junction box 55. This switch indicates when the planter 20 is not in an operating position. Other interfaces to the main control unit 10 may be provided such as serial or parallel links for transmitting information to other computer systems or printers.

The row control unit 60 has memory devices and logic devices within to modify and implement the commands from the main controller 10. The row control unit 60 reads information from a container memory circuit 80 attached to the pesticide container 40 and manipulates the commands from the main controller 10 to properly operate the metering device 72. For example, if the concentration of pesticide on row 1 is different than the concentration of pesticide on row 8, the row control unit 60 can modify the commands of the main controller 10 to properly dispense pesticides from all rows. The row control unit 60 also reads metering device 72 calibration data from the container memory circuit 80 and modifies the main controller 10 commands to account for differences in performance of different metering devices.

The row control unit 60 allows the possibility to completely change the programmed functions of the main controller 10. As an example, if a pre-programmed row control unit 60 is placed on a liquid herbicide sprayer, the main controller 10 would be able to read the dispenser type information and operate as a liquid sprayer controller.

The preferred embodiment shown in the FIGURES uses one row control unit 60 to control one metering device and memory unit 70. A row control unit 60 can control more than one device, for example, two metering device and memory units 70 or one metering device and memory unit 70 and one seed hopper and seed planting mechanism 30.

Each pesticide container 40 includes a metering or dispensing device 72 which allows controlled application rates under different conditions. The metering device 72 described herein is an electromechanical solenoid driven device for dry granular material. Other type of dispensers may be used for other materials, such as liquids.

Figure 2:
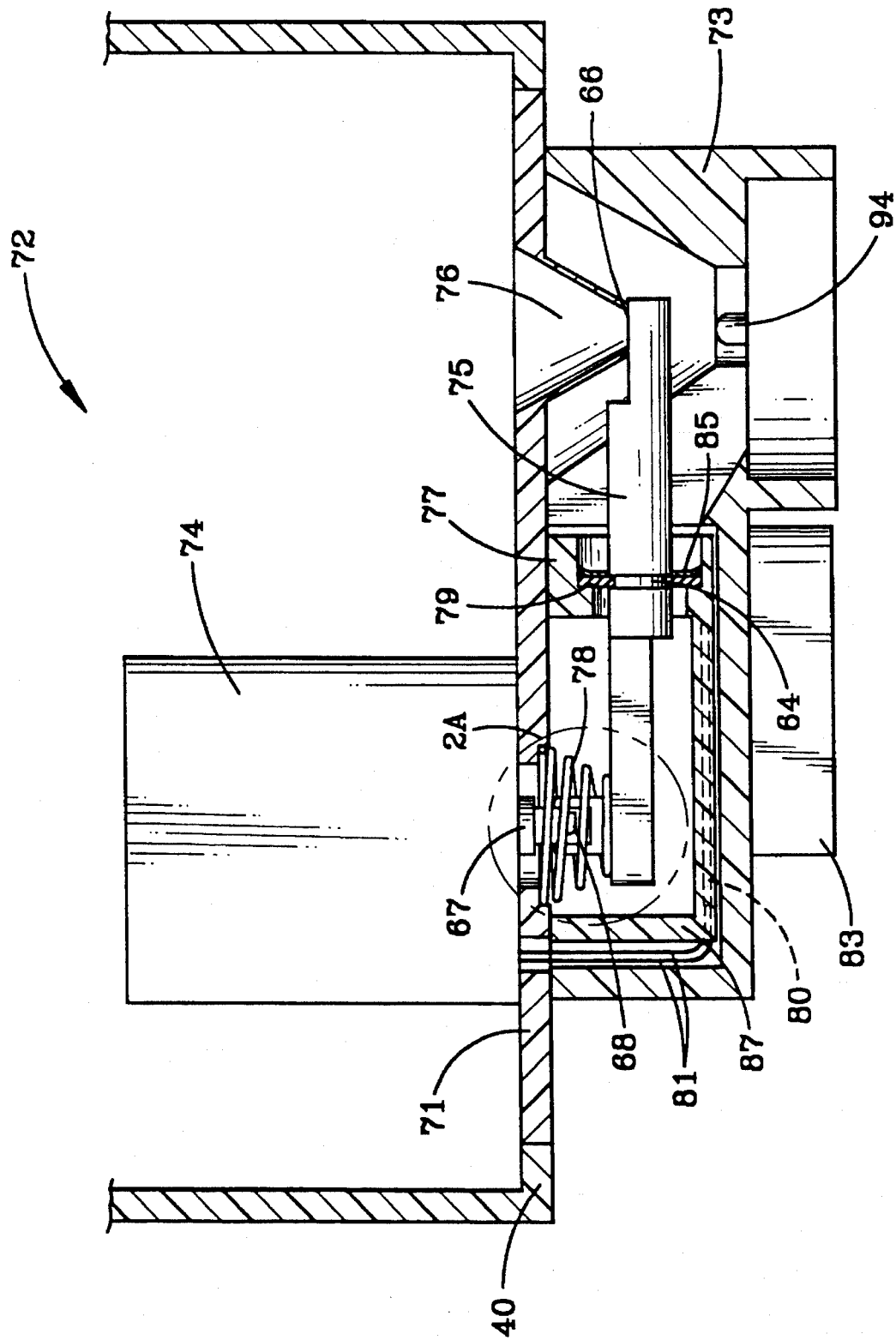
FIG. 2 is a cross-sectional side view of one embodiment of an electromechanical dispensing device for use with the material dispensing system shown in FIG. 1.

A side view of the metering device 72 is shown in FIG. 2. A base plate 71 is fastened to the bottom of the pesticide container 40. An electromechanical solenoid 74, attached to the base plate 71, is connected to one end of a pivoting metering bar 75 which pivots on pivot support 77. The other end of the metering bar 75 has a flat sealing face 66 which is biased into contact with an outlet aperture 76 by a spring 78. The solenoid 74 (shown in its first position with the sealing face 66 of the metering bar 75 closing the outlet aperture 76) is energized by the row control unit 60 to retract to a second position (not shown) to pivot the metering bar 75 away from the outlet aperture 76, thereby allowing pesticide to flow by gravity out of the pesticide container 40.

Although the typical power supply on a tractor is 12 volts DC, a 9 volt solenoid is used because of voltage drop from the tractor to the solenoid. To further assure proper operation of the solenoid 74, the row control unit 60 contains a voltage regulator set at 9½ volts.

The solenoid 74 must be sealed from the pesticide. Pesticide entering the solenoid 74 can cause its premature failure. The solenoid end of the metering bar 75, the spring 78 and the connection of the metering bar 75 to the solenoid 74 are sealed by a metering bar housing 87 to prevent entry of pesticide into the solenoid 74. The preferred method for pivoting the metering bar 75 and sealing the solenoid cover is to include a round flexible washer 79 in the pivot support 77 (which is part of metering bar housing 87). This flexible washer 79, sometimes referred to a "living hinge" has a small hole in the center, smaller than the diameter of the metering bar 75. Preferably, the metering bar 75 has a diameter $10/1000$" larger than the hole in the flexible washer 79. The metering bar 75 is inserted through the small hole in the flexible washer 79. The flexible washer 79 allows the metering bar 75 to pivot and seals the interior of the metering bar housing 87 from the pesticide.

The center of the metering bar 75 has a groove 64 about its circumference. The flexible washer 79 is seated in this groove 64. This, in conjunction with one end of the metering bar 75 being connected to the solenoid 74, keeps the metering bar 75 from moving relative to the pivot support 77. Without the groove 64, it is possible for the metering bar 75 to move slightly relative to the pivot support 77 and the outlet aperture 76. Slight movement of the metering bar 75 relative to outlet aperture 76 causes the angle of the metering bar 75 to the outlet aperture 76 to change when the metering bar 75 is pivoted away from the outlet aperture 76. This change in angle results in a change in the amount of granular material flowing from the outlet aperture 76.

Figure 2A:
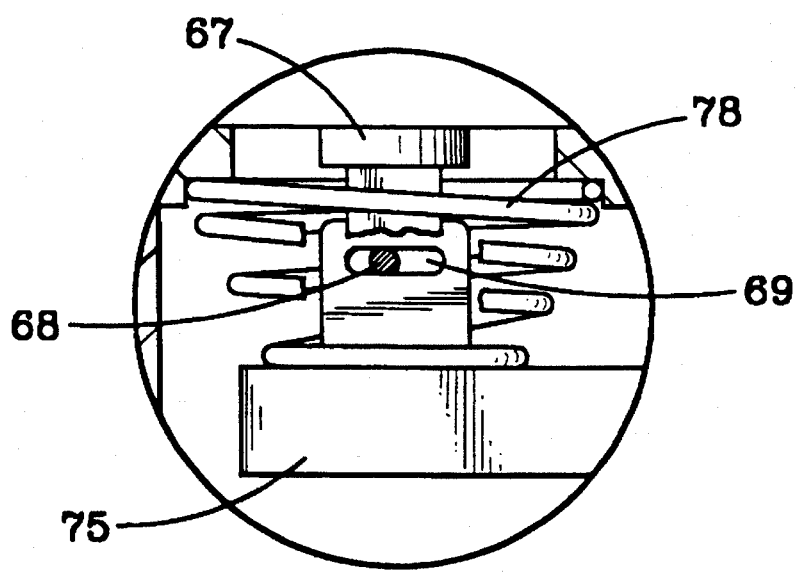

As shown in FIG. 2A, the metering bar 75 has a slot 69 in the end connected to the solenoid 74. The solenoid core 67 extends from the solenoid 74 and is connected to the metering bar 75 by a pin 68 extending through the slot 69 and the extended end of the solenoid core 67. This longitudinally extending slot 69 accommodates the arcuate movement of the end of the metering bar 75 as the metering bar pivots. Without the slot 69, the solenoid core 67 would have to shift to accommodate this angular movement, which can lead to failure of the solenoid 74 or poor performance of the solenoid 74.

Figure 6:
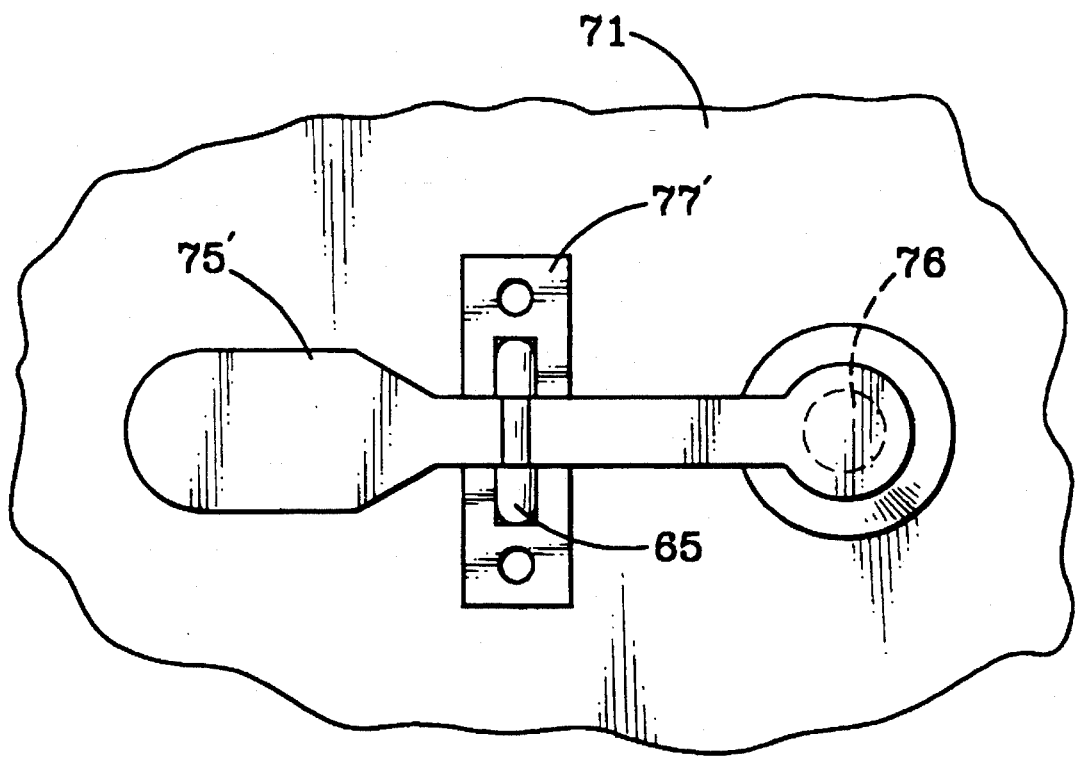
FIG. 6 is a bottom view of a portion of the electromechanical device shown in FIG. 5.
Figure 5:
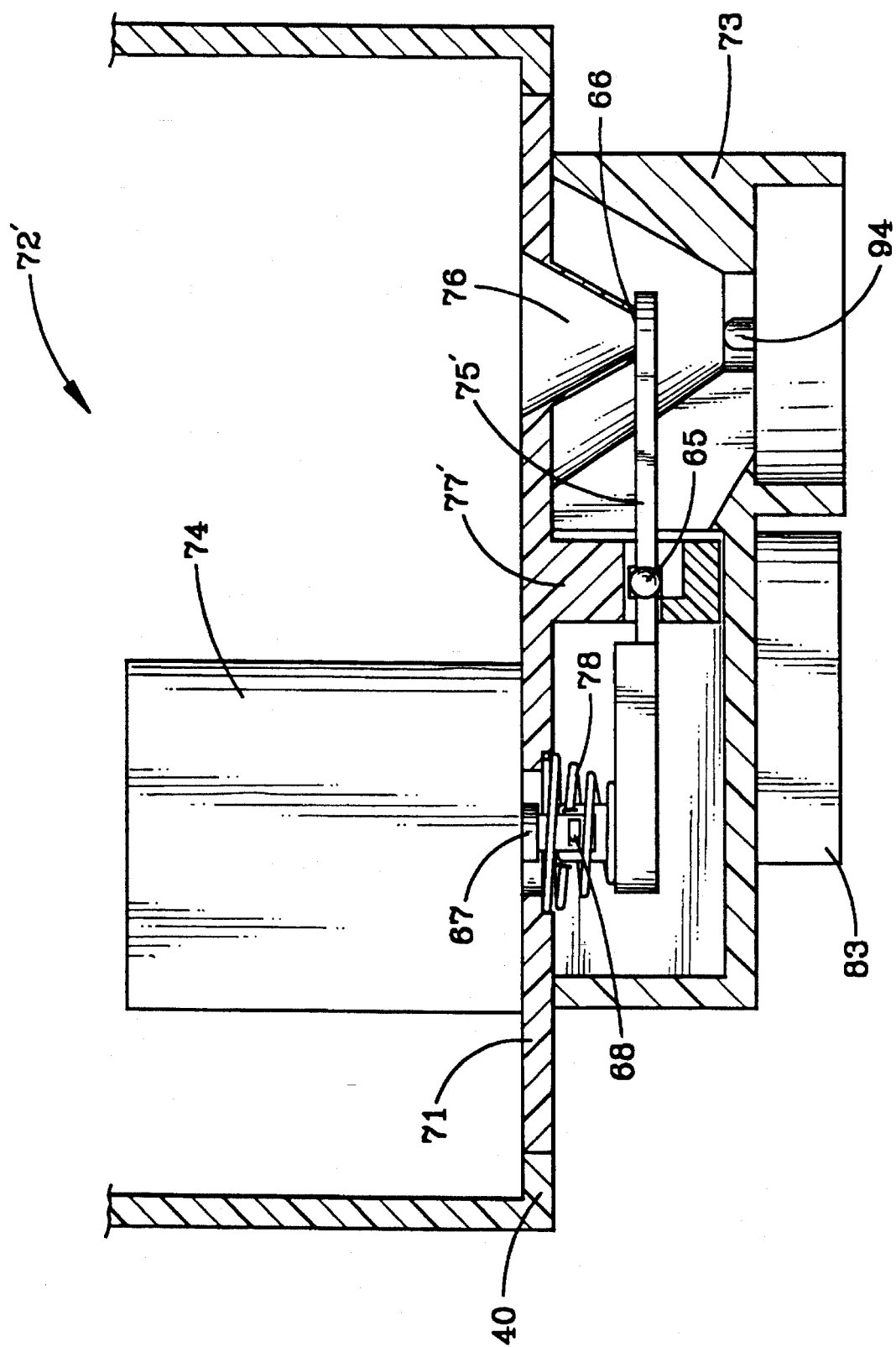
FIG. 5 is a side view of a second embodiment of an electromechanical dispensing device for use with the material dispensing system shown in FIG. 1.

FIGS. 5 and 6 show an alternate embodiment of the metering device 72'. The primary difference is the metering bar 75' and the pivot support 77'. The metering bar 75' has a pair of support arms 65 extending from the middle of the metering bar 75'. The metering bar 75' is attached to the base plate 71 by a two piece pivot support 77'. The metering bar 75' pivots about an axis passing through the support arms 65.

Figure 3:
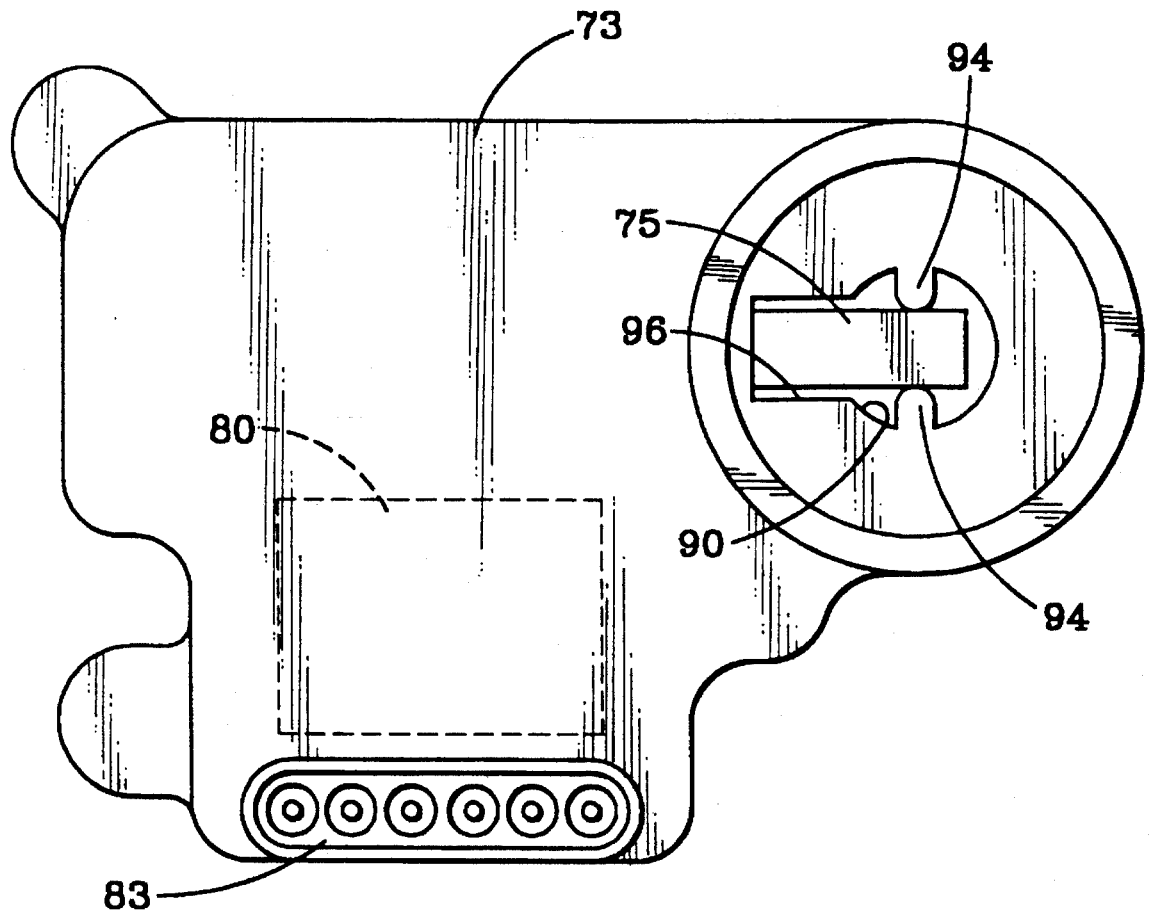
FIG. 3 is a bottom view of a metering unit housing.

Since the metering bar 75 is held closed against the outlet aperture 76, by a spring 78, it is susceptible to bouncing or jiggling open during shipment of the pesticide container 40. A metering unit housing 73, (shown in FIG. 3) attached to the base plate 71, encloses the metering bar housing 87, the outlet aperture 76 and the exposed end of the metering bar 75. A second outlet aperture 90, located in the metering unit housing 73, is in fluid communication with the container outlet aperture 76. A keyway 96, contiguous with the second outlet aperture 90, allows for the pivotal movement of the metering bar 75. A pair of bayonet lock engaging arms 94 extend inward from the periphery of the second outlet aperture 90.

Figure 4:
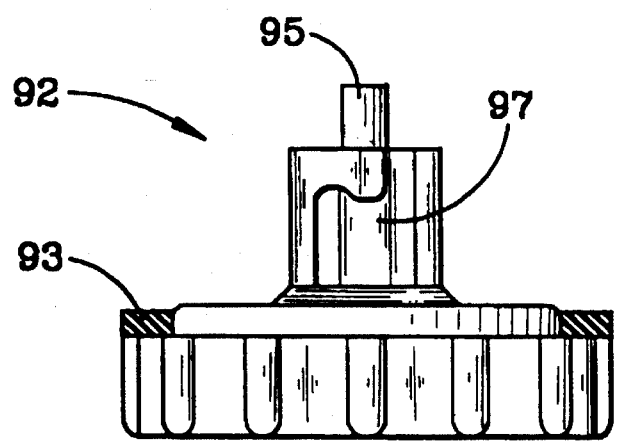
FIG. 4 is a side view of a shipping cap.

As shown in FIG. 4, a removable shipping cap 92 is provided which engages the bayonet lock engaging arms 94 to lock the cap 92 to the metering unit housing 73. The shipping cap 92 contains corresponding bayonet locks 97 which engage the bayonet lock engaging arms 94. A gasket 93 is provided to seal the shipping cap 92 to the metering unit housing 73. A moveable biased pin 95 is provided in the shipping cap 92 to press against underside of the metering bar 75 and bias the metering bar 75 against the container outlet aperture 76, thereby providing a force to hold the metering device 72 closed.

An electronic memory circuit 80 is connected to the solenoid 74. A multi-conductor cable 82 and connector 83 are used to connect the electronic memory circuit 80 to the row control unit 60. In one embodiment of the present invention, the row control unit 60 directly applies electrical power to the solenoid 74 through power wires 81. In addition to connecting the row control unit 60 solenoid power to the solenoid 74, the electronic memory circuit 80 also includes a non-volatile memory device. The memory device preferably is an E PROM, a non-volatile memory device that is electrically erasable programmable memory, also referred to as EEPROM or E$^2$PROM.

The combination of the electronic memory circuit 80 and the pesticide container 40 with attached metering device 72 creates a material container capable of electronically remembering and storing data important to the container, the material dispensing system, and the pesticide. Among the data which could be stored are: a serial number unique to that container, pesticide lot number, type of pesticide, metering calibration, date of filling, quantity of material in the container, quantity of material dispensed including specific rates of application, fields treated. This stored data can be recalled and updated as needed. The stored data can also be used by a metering controller or pumping system by accessing specific calibration numbers unique to the container and make needed adjustments, by sounding alarms when reaching certain volume of pesticide in a container, or keeping track of usage of the container to allow scheduling of maintenance.

An alternate embodiment of the electronic memory circuit 80 includes a means for blocking the application of electrical power to the solenoid 74, to assure that the solenoid 74 is only energized by the material dispensing system. The electronic memory circuit 80 can include an additional logic device which will only apply power to the solenoid 74 when a permissive control signal or command data is received from the row control unit 60.

In operation, the main control unit 10 receives a desired dispensing rate from the operator via the display 12 and keypad 14. The main control unit 10 monitors the planter's 20 ground speed by the radar unit 16. Using the desired dispensing rate, the ground speed and basic dispensing characteristics for the metering device 72, command data for the row control units 60 are prepared. The preferred dispensing control for a solenoid type metering device 72 is to use a fixed rate for actuating the metering device 72, 0.5 seconds, and vary the on time (or duty cycle) of the metering device 72, 10% to 50%. When the metering device 72 is "on" the solenoid 74 is energized causing the metering bar 75 to pivot away from the outlet aperture 76, thereby allowing the granular material to flow by gravity from the pesticide container 40. When the metering device 72 is "off" the solenoid 74 is de-energized. Spring 78 causes the metering bar 75 to pivot back to the outlet aperture 76 where a flat surface 66 on the end of the metering bar 75 seals the outlet aperture 76, stopping the flow of material from the container 40. The row control unit 60 modifies the duty cycle specified by the main control unit 10 to account the actual metering device 72 calibration data which was retrieved from the memory circuit 80. The row control unit 60 continues to operate the metering device 72 at the rate and duty cycle specified by the main control unit 10 until new commands are received from the main control unit 10. The main control unit 10 also calculates the quantity of material remaining in the pesticide container 40.

The row control unit 60 has a flow sensor as part of its electronic circuits. The flow sensor senses the flow of material from the pesticide container 40. The main control unit 10 can monitor the flow sensors and generate visual and audible alarms as required. The flow sensor consists of an infra-red light source positioned across from an infra-red light detector. These two components are mounted on a printed circuit board which is part of the row control unit 60. A hole is made in the board between the light source and the light sensor. The dispensed pesticide is guided through this hole by a light transparent tube. The logic circuit associated with the flow sensor monitors for the presence of flow by intermittent interruptions of the light reaching the light sensor. Since the pesticide is dispensed as granular particles, proper flow will cause intermittent interruptions of the light. A non-interrupted light will signal no material flowing from the pesticide container 40. A completely interrupted light will indicate a blockage of the tubing after the flow sensor.

To operate the material dispensing system, it is necessary for the main control unit 10 to uniquely identify the row control unit 60, metering device and memory unit 70 pairs. Each metering device and memory unit 70 includes a unique electronic serial number in the memory device 80. Each row control unit 60 also has a unique electronic serial number. When the material dispensing system is initialized, the main control unit 10 must poll or query all the metering device and memory units 70 and row control units 60 to determine by serial number which units 70, 60 are attached to the planter 20. This is sufficient identification for the system to function. In the preferred embodiment, the operator should be able to refer to a row and its associated seed and material dispensing equipment as row x, rather than by the serial number of the metering device and memory unit 70 or by the serial number of the row control unit 60. To associate a particular metering device and memory unit 70 and row control unit 60 to a particular row, a row configuration method is provided.

The main control unit 10 is initialized in a configuration mode with no row control units 60 connected. The row control units 60 are then connected to the main control unit 10 via the junction box(es) 55 one at a time in the order in which the operator would like them to represent. The first row control unit 60 connected would represent row one. This allows an operator who prefers to work from left to right to have the left most row row 1 and an operator who prefers to work from right to left to have the right most row row 1.

With a many as 24 rows on a planter 20, it is necessary to control or limit the current drawn by the metering solenoids 74. If all 24 solenoids were operated simultaneously, the current demands could exceed the capacity of the operator's tractor.

The rate at which the metering device 72 is operated is typically 0.5 seconds. The metering device 72 is actually activated at a 10% to 50% duty cycle (10% to 50% of the rate). The solenoid is turned on at 0.5 second intervals for 0.05 to 0.25 seconds. The preferred method of varying the dispensing rate is to keep the rate fixed and vary the duty cycle. Minimum current demand can be achieved by sequencing the activation of each metering device 72. The optimum sequence time is defined as: Rate/Number of Rows. For a 4 row system operating at a rate of 0.5 seconds, the sequence time is 0.125 seconds (0.5 seconds/4). This means that the metering devices 72 are started at 0.125 second intervals. A variation of this sequencing is to divide the metering devices 72 into groups, and stagger the starting times of each group.

The system operates in the following manner: Material dispensing begins with the main control unit 10 sending each row control unit 60 a "start" command at the appropriate time (the sequence time). The row control unit 60 does not actually receive and use the sequence time value. Because of variations in the operation of the multiple row control units 60, the row control units 60 will drift away from the ideal sequencing. It is necessary to periodically issue a "re-sync" at approximately one minute intervals and basically restart each metering device 72 which re-synchronizes each row control unit 60 back to the main control unit's 10 time base.

An alternate power sequencing method requires the main control unit 10 to send a sequence time or delay time to each row control unit 60. The main control unit 10 then sends a start command to all row control units 60 simultaneously. Each row control unit 60 then activates the associated metering device 72 after the time delay previously specified. The material dispensing system features and capabilities include:

Controls application rate of material under varying operating conditions. The application rate can be set by the operator from an operator's console or can be automatically read from the material container meter unit. The later technique offers an advantage in that it does not allow the operator to enter an incorrect application rate.

The system will not allow material application if the material identification number for all rows do not match. This prevents inadvertent application of two different pesticides.

Provides actual ground speed information if a ground speed sensor is attached. Typical ground speed sensor include wheel rpm and radar. In lieu of a ground speed sensor, a fixed planting speed may be entered and used to distribute the granular pesticide material.

The system monitors material flow and alerts the operator to no flow, empty container, or blocked flow conditions.

The system monitors and tracks container material level for each row.

The system provides control information and data to a non-volatile memory for future downloading.

The system monitors the planter to allow pesticide to be applied only when the planter is in the planting position.

A typical usage for this system is:

1) For a new pesticide container, the metering device and memory unit 70 is attached to the pesticide container 40 by either the container manufacturer or at the container filling site.

2) A computer is connected to the metering device and memory unit 70 at the time of filling. The following information is electronically stored in memory device 80:

Date
EPA chemical ID numbers
Container serial number
Suggested doses, such as ounces per acre for root worm, or ounces per acre for ants, etc. These rates are specified by EPA.
Meter calibration information, depending on type of metering device
Tare weight of the container
Weight of the full container 3) The container is sealed and prepared for shipping.

4) The end user, the farmer, buys the chemical container from a distributor. The distributor connects the metering device and memory unit 70 to a computer and stores the buyer's EPA registration number, distributor's ID number and date in the metering device and memory unit 70.

5) The end user takes the pesticide container 40 and attaches to dispensing implement, such as planter, sprayer, nurse tank, etc. The main controller 10 compares the user's EPA registration number with the EPA registration stored in metering device and memory unit 70. If the registration numbers do not match, the material dispensing system will not function. The main controller 10 receives the information from the metering device and memory unit 70 pertaining to proper application rates and prompts the user to pick the desired rate. The row control unit 60 reads the metering device calibration information from the metering device and memory unit 70. This information is used in combination with commands from the main controller 10 to properly control the operation of the metering device 72. The main controller 10 prompts the user to enter estimated amount of acreage to be covered. The amount of pesticide remaining in the containers 40 is checked and an alarm is generated if the amount in the containers is not enough to cover the estimated acreage. The user enters a field ID number and any other required information such as number of rows, width between rows, etc, The user then applies the pesticide to the field. The main controller 10 monitors the ground speed and changes the amount being dispensed to keep a constant rate per acre. When the user finishes a field, additional fields may be treated. Field data, including field ID number, crop treated and quantity applied is recorded in the main controller's 10 non-volatile memory. This information may also be recorded in the metering device and memory unit 70 for later use by the distributor or pesticide supplier.

6) The empty or partially used pesticide container 40 is returned to the distributor. Either the recorded usage information or the current weight of the container can be used to determine a credit for any unused pesticide.

Having described the invention, what is claimed is:

1. A metering device comprising:

a housing having an outlet aperture;

a container mounted on said housing and including a bottom wall having an outlet aperture, the container being disposed with a supply of fluent material and having its outlet aperture in fluid communication with the outlet aperture of said housing;

an electromechanical solenoid attached to the container, the solenoid being operable between a first position and a second position; and a metering bar pivotably attached to the container, the metering bar having a first end and a second end, the first end being linked to the solenoid, the second end pivoting to a closed position against the outlet aperture of the container when the solenoid is in the first extended position, the second end pivoting to an open position when the solenoid is in the second retracted position.

2. The metering deuce according to claim 1, further comprising:

a biasing means for biasing the metering bar to the closed position.

3. The metering device according to claim 1, further comprising:

flexible means for pivotably attaching the metering bar to the container.

4. The metering device according to claim 1, further comprising:

a flexible member having a central opening therethrough, the edges of the flexible member being fixedly attached to the container, the metering bar being inserted through the flexible member central opening whereby the first end of the metering bar and the second end of the metering bar are disposed on opposite sides of the flexible member, the flexible member permitting the metering bar to pivot when the solenoid moves from one position to the other position.

5. The metering device according to claim 4, wherein the metering bar has a groove thereabout, the flexible member sealingly engaging the groove.

6. The metering device according to claim 1, further comprising;

a longitudinally extending slot through the first end of the metering bar; and a connecting pin extending through the slot thereby connecting the first end of the metering bar to the solenoid.

7. The metering device according to claim 1, further comprising:

a pivot support extending away from the container wall;

the metering bar having two support arms extending therefrom, the pivot support engaging the metering bar support arms, the metering bar pivoting about an axis extending through the support arms.

8. The metering device according to claim 1, further comprising:

a removable shipping cap engaging the housing outlet aperture, the shipping cap having a movable pin attached thereto, the movable pin being biased into contact with the metering bar second end thereby holding the metering bar second end in the closed position, the housing and the shipping cap each having an interengaging means for locking the shipping cap into engagement with the housing, the interengaging means comprising a bayonet lock.

9. A metering device comprising:

a container including a bottom wall having an outlet aperture, the container being disposed with a supply of fluent material;

a housing having an outlet aperture, the housing outlet aperture being in fluid communication with the container outlet aperture;

an electromechanical solenoid attached to the container, the solenoid being operable between a first position and a second position;

a metering bar pivotably attached to the container, the metering bar having a first end and a second end, the first end being linked to the solenoid, the second end pivoting to a closed position when the solenoid is in the first position whereby the outlet aperture is closed by the second end, thereby preventing the flow of fluent material from the container, the second end pivoting to an open position when the solenoid is in the second position, whereby the outlet aperture is uncovered, thereby permitting the flow of fluent material from the container, the first end of the metering bar having a longitudinal slot therethrough;

a connecting pin extending through the metering bar slot connecting the first end of the metering bar to the solenoid;

means for biasing the metering bar to the closed position; and flexible means for pivotally connecting the metering bar to the container.

10. The metering device according to claim 9, wherein the flexible means comprises:

a flexible member having a central opening therethrough, the flexible member being operably attached to the container, the metering bar being inserted through the flexible member central opening whereby the first end of the metering bar and the second end of the metering bar are disposed on opposite sides of the flexible member, the flexible member permitting the metering bar to pivot when the solenoid moves from one position to the other position.

11. The metering device according to claim 10, wherein the metering bar has a groove thereabout, the flexible member sealingly engaging the groove.

12. The metering device according to claim 9, further comprising:

a removable shipping cap engaging the housing outlet aperture, the shipping cap holding the metering bar second end in the closed position.

13. The metering device according to claim 9, further comprising:

a removable shipping cap engaging the housing outlet aperture, the shipping cap having a movable pin attached thereto, the movable pin being biased into contact with the metering bar second end, thereby holding the metering bar second end in the closed position, the housing and the shipping cap each having an interengaging means for locking the shipping cap into engagement with the housing.

14. A metering device comprising:

a container including a bottom wall having an outlet aperture, the container being disposed with a supply of fluent material;

a housing having an outlet aperture, the housing outlet aperture being in fluid communication with the container outlet aperture;

an electromechanical solenoid attached to the container, the solenoid being operable between a first position and a second position;

a metering bar pivotably attached to the container, the metering bar having a first end and a second end, the first end being linked to the solenoid, the second end pivoting to a closed position when the solenoid is in the first position whereby the outlet aperture is closed by the second end, thereby preventing the flow of fluent material from the container, the second end pivoting to an open position when the solenoid is in the second position, whereby the outlet aperture is uncovered, thereby permitting the flow of fluent material from the container, the first end of the metering bar having a longitudinally extending slot therethrough, the metering bar having a groove thereabout;

a connecting pin extending through the metering bar slot connecting the first end of the metering bar to the solenoid;

means for biasing the metering bar to the closed position; and a flexible member having a central opening therethrough, the flexible member being fixedly attached to the container, the metering bar being inserted through the flexible member central opening, whereby the first end of the metering bar and the second end of the metering bar are disposed on opposite sides of the flexible member, the flexible member permitting the metering bar to pivot when the solenoid moves from one position to the other position, the flexible member sealingly engaging the groove.

15. The metering device according to claim 14, further comprising:

a removable shipping cap engaging the housing outlet aperture, the shipping cap having a movable pin attached thereto, the movable pin being biased into contact with the metering bar second end, thereby holding the metering bar second end in the closed position, the housing and the shipping cap each having an interengaging means for locking the shipping cap into engagement with the housing.

16. A metering device comprising:

a container including a bottom wall having an outlet aperture, the container being disposed with a supply of fluent material;

a housing having an outlet aperture, the housing outlet aperture being in fluid communication with the container outlet aperture;

an electromechanical solenoid attached to the container, the solenoid being operable between a first position and a second position;

a metering bar pivotably attached to the container, the metering bar having a first end and a second end, the first end being linked to the solenoid, the second end pivoting to a closed position when the solenoid is in the first position, whereby the outlet aperture is closed by the second end, thereby preventing the flow of fluent material from the container, the second end pivoting to an open position when the solenoid is in the second position, whereby the outlet aperture is uncovered, thereby permitting the flow of fluent material from the container, the first end of the metering bar having a longitudinally extending slot therethrough, the metering bar having two support arms extending therefrom, the metering bar pivoting about an axis extending through the support arms;

a connecting pin extending through the metering bar slot connecting the first end of the metering bar to the solenoid;

means for biasing the metering bar to the closed position; and a pivot support extending away from the container wall, the pivot support engaging the metering bar support arms.

* * * * *